No. 643,048. Patented Feb. 6, 1900.
T. B. FAGAN.
MOWING MACHINE ATTACHMENT.
(Application filed Sept. 27, 1899.)
(No Model.)
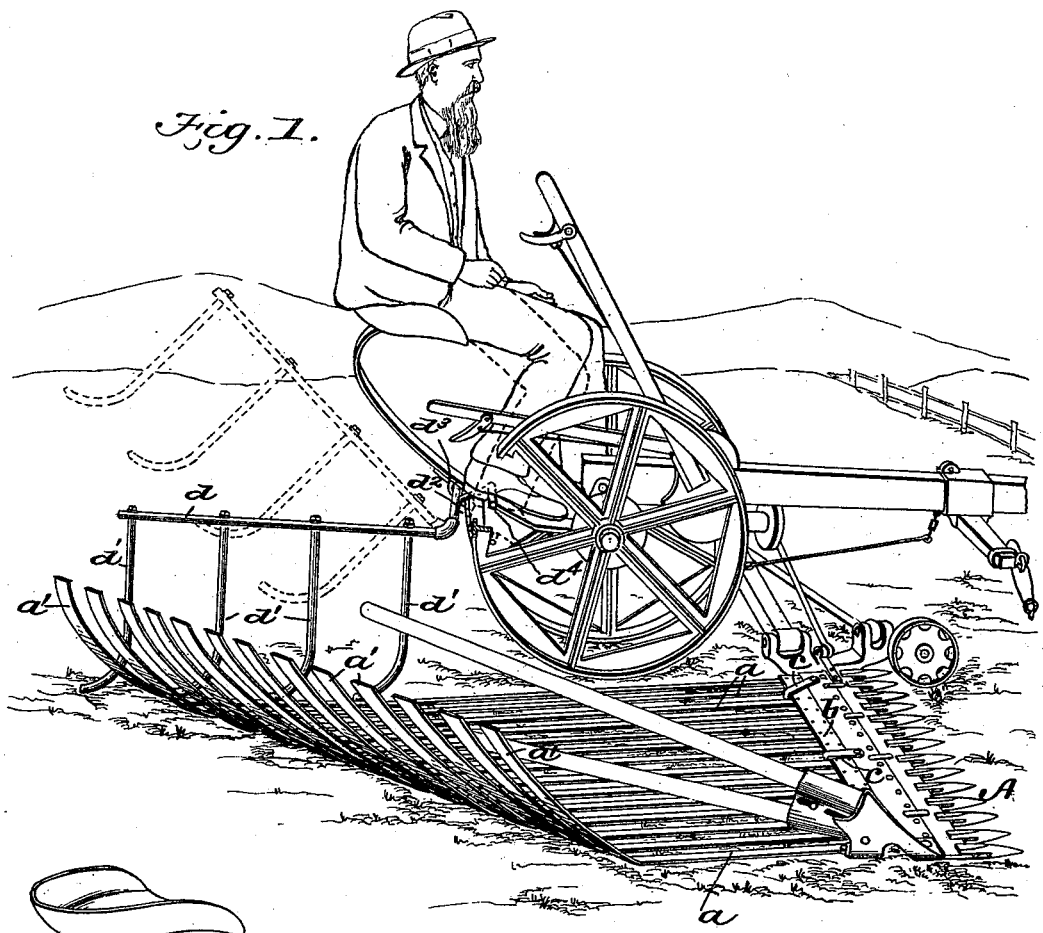
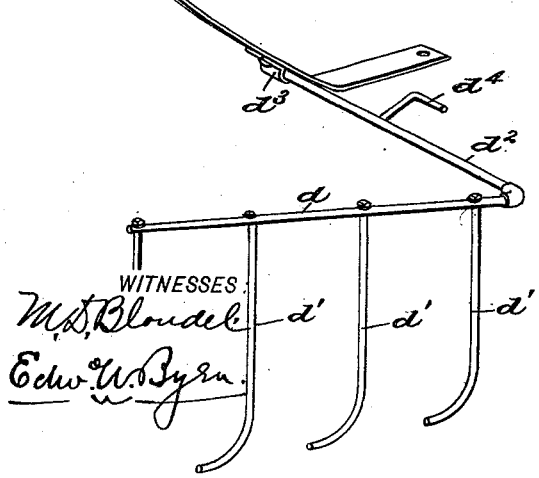
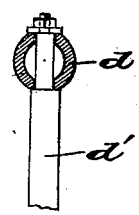
WITNESSES
INVENTOR
T. B. Fagan.
BY
ATTORNEYS

UNITED STATES PATENT OFFICE.

REISSUED

THOMAS B. FAGAN, OF VAN WERT, OHIO.

MOWING-MACHINE ATTACHMENT.

SPECIFICATION forming part of Letters Patent No. 643,048, dated February 6, 1900.

Application filed September 27, 1899. Serial No. 731,785. (No model.)

*To all whom it may concern:*

Be it known that I, THOMAS B. FAGAN, of Van Wert, in the county of Van Wert and State of Ohio, have invented a new and useful Improvement in Mowing-Machine Attachments, of which the following is a specification.

My invention is in the nature of an attachment to a mowing-machine, designed to be secured in the rear of the finger-bar of any machine for the purpose of gathering the grass or clover into bunches and discharging the bunches behind the truck of the mower, where it is out of the way of the team on the next round; and it consists in the peculiar construction and arrangement of the devices which I will now proceed to describe, reference being had to the accompanying drawings, in which—

Figure 1 is a perspective view of a mower having my invention applied. Fig. 2 is a perspective view of the buncher and dropper, and Fig. 3 is a detail.

In the drawings, A represents the finger-bar of any ordinary mower. To this is applied in rear of the same a gathering and turning device for the grass, consisting of a series of flat steel bars $a$, connected together in front by a cross-bar $b$ and detachably secured to the rear of the finger-bar by yokes $c$, with suitable bolts or set-screws. The flat steel bars are shortest at the outer end of the finger-bar and longest near the inner end and terminate at their rear ends on a diagonal line, their rear ends being turned up, as shown at $a'$, and twisted laterally, so that the planes of their upturned ends are not at right angles to the line of draft, but occupy an inclined or diagonal position thereto, which causes them to exert a turning action upon the grass after the principle of the moldboard of a plow. This causes the grass to be gathered as it is cut and directed inwardly toward the driver's seat, when it is held by a buncher and dropper. This latter consists of an arm $d$, having any suitable number of teeth, tines, or prongs $d'$, extending therefrom at right angles down toward the ground and arranged with their lower ends to drag upon the ground beside the longest one of the flat metal strips, so as to act as a gate to prevent the grass from being discharged from the gatherer until sufficient has accumulated to form a bunch for a windrow. When this occurs, the arm $d$ is raised, as shown by dotted lines, and the grass is allowed to be discharged with a side delivery behind the truck-wheels of the mower. The gate-arm $d$ (see Fig. 2) is rigidly connected to or formed on a rock-shaft $d^2$, journaled in bearings $d^3$, near the base of the driver's seat, and this rock-shaft has a foot-treadle $d^4$ upon the opposite side of the rock-shaft from the gate-arm, by pressing upon which treadle with his foot the driver is able at will to lift the gate and discharge the bunch of grass.

The tines or prongs $d'$ of the gate have their lower ends bent, as shown, to enable them to trail along on the ground without catching and hanging. To enable the machine to turn corners or be backed, these tines or prongs are not rigidly attached to their carrying-arms $d$, but are loosely swiveled thereon at the top, as shown in Fig. 3, so that the said tines may turn about their vertical axes as their lower ends trail on the ground when the machine is turning. This prevents these teeth from catching into obstructions and permits the load of grass to be held on the gatherer even in turning at a turning row, so the bunch of grass need not be dumped at the turning row, where it would be in the way of the feet of the team.

Having thus described my invention, what I claim as new, and desire to secure by Letters Patent, is—

1. In a mower, the combination with a gatherer arranged behind the cutter-bar and composed of parallel slats turned up at their rear ends on a diagonal line; of a gate composed of an arm having pendent teeth or tines arranged along the line of draft parallel with the delivery side of the gatherer, said arm being made adjustable to be lifted from the gatherer to discharge the bunch of grass substantially as described.

2. The combination with a mower having a gatherer with a side delivery; of a vertically-working gate having swiveling pendent prongs or teeth curved at their lower ends substantially as and for the purpose described.

In testimony whereof I have signed my name to this specification in the presence of two subscribing witnesses.

THOMAS B. FAGAN.

Witnesses:
 CHARLES RECTOR, Jr.,
 URBAN H. HESTER.